(12) United States Patent
Zirnstein et al.

(10) Patent No.: US 10,776,706 B2
(45) Date of Patent: Sep. 15, 2020

(54) COST-DRIVEN SYSTEM AND METHOD FOR PREDICTIVE EQUIPMENT FAILURE DETECTION

(71) Applicant: Honeywell International Inc., Morris Plains, NJ (US)

(72) Inventors: Jan Zirnstein, St. Louis Park, MN (US); David J. Germann, North Vancouver (CA); Marc Light, Saint Paul, MN (US); Gregory E. Stewart, North Vancouver (CA); Jonathan T. Grunow, Indian Trail, NC (US)

(73) Assignee: Honeywell International Inc., Morris Plaines, NJ (US)

( * ) Notice: Subject to any disclaimer, the term of this patent is extended or adjusted under 35 U.S.C. 154(b) by 952 days.

(21) Appl. No.: 15/053,978

(22) Filed: Feb. 25, 2016

(65) Prior Publication Data

US 2017/0249554 A1    Aug. 31, 2017

(51) Int. Cl.
*G06N 5/04* (2006.01)
*G06N 20/00* (2019.01)
*G05B 23/02* (2006.01)

(52) U.S. Cl.
CPC .......... *G06N 5/04* (2013.01); *G05B 23/0283* (2013.01); *G06N 20/00* (2019.01)

(58) Field of Classification Search
None
See application file for complete search history.

(56) References Cited

U.S. PATENT DOCUMENTS 5,657,390 A    8/1997 Elgamal et al.
6,480,896 B1    11/2002 Brown et al.
(Continued)

FOREIGN PATENT DOCUMENTS

WO    WO 2005/020179 A1    3/2005

OTHER PUBLICATIONS

Domingos, Pedro. "Metacost: A general method for making classifiers cost-sensitive." In Proceedings of the fifth ACM SIGKDD international conference on Knowledge discovery and data mining, pp. 155-164. ACM (Year: 1999).*

(Continued)

*Primary Examiner* — Vincent Gonzales
*Assistant Examiner* — Casey R. Garner
(74) *Attorney, Agent, or Firm* — Paschall & Associates, LLC; James C. Paschall; Anthony Miologos

(57) ABSTRACT

A method includes identifying costs associated with different outcomes of a failure prediction algorithm. The algorithm is configured to predict one or more faults with at least one piece of industrial equipment. The different outcomes include both successful and unsuccessful predictions by the algorithm. The method also includes identifying a threshold value for the algorithm using the costs, where the threshold value is used by the failure prediction algorithm to identify whether maintenance of the at least one piece of industrial equipment is needed. The method further includes providing the threshold value to the algorithm. The threshold value is selected such that a net positive economic benefit is obtained from use of the threshold value with the failure prediction algorithm. In addition, the method can include generating a signal indicating whether maintenance is needed based on a comparison of an indicator value calculated using the algorithm and the threshold value.

15 Claims, 6 Drawing Sheets

(56) References Cited

U.S. PATENT DOCUMENTS

| | | | |
|---|---|---|---|
| 6,816,973 | B1 | 11/2004 | Gleichauf et al. |
| 6,892,317 | B1* | 5/2005 | Sampath .................. G06F 11/25 714/4.3 |
| 7,130,891 | B2 | 10/2006 | Bernardin et al. |
| 7,233,830 | B1 | 6/2007 | Callaghan et al. |
| 7,266,417 | B2 | 9/2007 | Liao |
| 7,286,897 | B2 | 10/2007 | Liu et al. |
| 7,313,447 | B2 | 12/2007 | Hsiung et al. |
| 7,343,152 | B1 | 3/2008 | Khorram |
| 7,461,403 | B1 | 12/2008 | Libenzi et al. |
| 7,548,977 | B2 | 6/2009 | Agapi et al. |
| 7,584,274 | B2 | 9/2009 | Bond et al. |
| 7,620,986 | B1 | 11/2009 | Jagannathan et al. |
| 7,636,764 | B1 | 12/2009 | Fein et al. |
| 7,684,876 | B2 | 3/2010 | Grgic |
| 7,693,581 | B2 | 4/2010 | Callaghan et al. |
| 7,799,273 | B2 | 9/2010 | Popp |
| 7,870,106 | B1 | 1/2011 | Nguyen et al. |
| 7,873,719 | B2 | 1/2011 | Bishop et al. |
| 7,886,065 | B1 | 2/2011 | Satish et al. |
| 7,957,335 | B2 | 6/2011 | Durazzo et al. |
| 8,204,717 | B2 | 6/2012 | McLaughlin et al. |
| 8,285,522 | B1* | 10/2012 | Tryon, III ........... G06F 17/5009 702/34 |
| 2002/0078382 | A1 | 6/2002 | Sheikh et al. |
| 2003/0014498 | A1 | 1/2003 | Kreidler et al. |
| 2003/0120402 | A1* | 6/2003 | Jaw ....................... G01M 15/00 702/182 |
| 2003/0120778 | A1 | 6/2003 | Chaboud et al. |
| 2003/0182359 | A1 | 9/2003 | Vorchik et al. |
| 2004/0002943 | A1 | 1/2004 | Merrill et al. |
| 2004/0128539 | A1 | 7/2004 | Shureih |
| 2005/0021594 | A1 | 1/2005 | Bernardin et al. |
| 2005/0195840 | A1 | 9/2005 | Krapp et al. |
| 2005/0276228 | A1 | 12/2005 | Yavatkar et al. |
| 2005/0278441 | A1 | 12/2005 | Bond et al. |
| 2006/0004786 | A1 | 1/2006 | Chen et al. |
| 2006/0059163 | A1 | 3/2006 | Frattura et al. |
| 2006/0085393 | A1 | 4/2006 | Modesitt |
| 2006/0155633 | A1 | 7/2006 | Fellenstein et al. |
| 2006/0184626 | A1 | 8/2006 | Agapi et al. |
| 2006/0230149 | A1 | 10/2006 | Jackson |
| 2007/0055702 | A1 | 3/2007 | Fridella et al. |
| 2008/0120414 | A1 | 5/2008 | Kushalnagar et al. |
| 2008/0159289 | A1 | 7/2008 | Narayanan et al. |
| 2008/0208361 | A1 | 8/2008 | Grgic |
| 2008/0270523 | A1 | 10/2008 | Parmar et al. |
| 2008/0295173 | A1 | 11/2008 | Tsvetanov |
| 2009/0058088 | A1 | 3/2009 | Pitchford et al. |
| 2009/0125370 | A1 | 5/2009 | Blondeau et al. |
| 2009/0132070 | A1 | 5/2009 | Ebrom et al. |
| 2009/0172035 | A1 | 7/2009 | Lessing et al. |
| 2009/0210071 | A1 | 8/2009 | Agrusa et al. |
| 2009/0271012 | A1 | 10/2009 | Kopka et al. |
| 2009/0300151 | A1 | 12/2009 | Friedman et al. |
| 2009/0300210 | A1 | 12/2009 | Ferris |
| 2009/0300635 | A1 | 12/2009 | Ferris |
| 2010/0022231 | A1 | 1/2010 | Heins et al. |
| 2010/0023151 | A1 | 1/2010 | Shieh et al. |
| 2010/0042720 | A1 | 2/2010 | Stienhans et al. |
| 2010/0256794 | A1 | 10/2010 | McLaughlin et al. |
| 2010/0257227 | A1 | 10/2010 | McLaughlin et al. |
| 2010/0257228 | A1 | 10/2010 | Staggs et al. |
| 2010/0257605 | A1 | 10/2010 | McLaughlin et al. |
| 2015/0039552 | A1* | 2/2015 | Moyne .................. G06Q 40/00 706/52 |
| 2016/0350671 | A1* | 12/2016 | Morris, II .............. G06N 20/00 |
| 2016/0371585 | A1* | 12/2016 | McElhinney ....... G06F 17/5009 |

OTHER PUBLICATIONS

Saxena, Abhinav, Jose Celaya, Edward Balaban, Kai Goebel, Bhaskar Saha, Sankalita Saha, and Mark Schwabacher. "Metrics for evaluating performance of prognostic techniques." In Prognostics and health management, 2008. phm 2008. international conference on, pp. 1-17. IEEE (Year: 2008).*

Hanley, James A., and Barbara J. McNeil. "A method of comparing the areas under receiver operating characteristic curves derived from the same cases." Radiology 148, No. 3 (1983): 839-843 (Year: 1983).*

European Search Report dated Jun. 20, 2017 in connection with European Patent Application No. 17 15 4090.

EPO, "The technical aspects of the claimed invention relate to the use of a general-purpose method and system for processing data of an inherently non-technical nature. The information technology employed is considered to be generally known. See also official Journal Nov. 2007", Official Journal of the European Patent Office, vol. 30, No. 11, Nov. 1, 2007, pp. 592-593.

Aaron Skonnard, "Why Service Virtualization Matters", Microsoft Services, 4 pages, Mar. 2009.

Kevin P. Staggs, et al., "Cloud Computing for an Industrial Automation and Manufacturing System", U.S. Appl. No. 12/416,859, filed Apr. 1, 2009, 28 pgs.

Paul F. McLaughlin, et al., "Cloud Computing for a Manufacturing Execution System", U.S. Appl. No. 12/416,790, filed Apr. 1, 2009, 28 pgs.

Paul F. McLaughlin, et al., "Cloud Computing as a Basis for a Process Historian", U.S. Appl. No. 12/416,830, filed Apr. 1, 2009, 28 pgs.

"Real-Time Data Hosting . . . ", www.industrialevolution.com/ms_services_host.html, 1 page, Jan. 2000.

Notification of Transmittal of the International Search Report and the Written Opinion of the International Searching Authority, or the Declaration dated Oct. 29, 2010 in connection with International Patent Application No. PCT/US2010/028218, 10 pgs.

Notification of Transmittal of the International Search Report and the Written Opinion of the International Searching Authority, or the Declaration dated Oct. 29, 2010 in connection with International Patent Application No. PCT/US2010/028210, 9 pgs.

Notification of Transmittal of the International Search Report and the Written Opinion of the International Searching Authority, or the Declaration dated Oct. 29, 2010 in connection with International Patent Application No. PCT/US2010/028208, 9 pgs.

Gregory E. Stewart et al., "Calibration Technique for Rules Used With Asset Monitoring in Industrial Process Control and Automation Systems", U.S. Appl. No. 15/053,942, filed Feb. 25, 2016, 35 pgs.

David J. Germann et al., "System and Method for Asset Fleet Monitoring and Predictive Diagnostics Using Analytics for Large and Varied Data Sources ", U.S. Appl. No. 14/871,205, filed Sep. 30, 2015, 35pgs.

* cited by examiner

800A

TRUE-POSITIVE-RATE: 4/4
FALSE-POSITIVE-RATE: 5/6

| | | ACTUAL | |
|---|---|---|---|
| | | FAIL | WORK |
| t=0.25 DECISION | FAIL | TP=4 | FP=5 |
| | WORK | FN=0 | TN=1 |

800B

TRUE-POSITIVE-RATE: 3/4
FALSE-POSITIVE-RATE: 2/6

| | | ACTUAL | |
|---|---|---|---|
| | | FAIL | WORK |
| t=0.65 DECISION | FAIL | TP=3 | FP=2 |
| | WORK | FN=1 | TN=4 |

COST-DRIVEN SYSTEM AND METHOD FOR PREDICTIVE EQUIPMENT FAILURE DETECTION

TECHNICAL FIELD

This disclosure relates generally to techniques for identifying faulty equipment. More specifically, this disclosure relates to a cost-driven system and method for predictive equipment failure detection.

BACKGROUND

Industrial process control and automation systems are routinely used to automate large and complex industrial processes. Maintaining the equipment in industrial processes can be financially burdensome due to things like the costs of equipment replacements and lost operating times when equipment fails. Predictive algorithms can be used to predict whether a piece of equipment is experiencing a problem or about to fail, allowing maintenance to be scheduled for that piece of equipment. However, when designing an algorithm to predict whether a piece of equipment requires maintenance, the algorithm's developer is often faced with a dilemma. Algorithms typically use a threshold value to determine whether maintenance for a piece of equipment is needed. If the threshold value is too low, the algorithm results in too many service calls for equipment that is functional. If the threshold value is too high, the algorithm may not schedule adequate maintenance for faulty equipment.

SUMMARY

This disclosure provides a cost-driven system and method for predictive equipment failure detection.

In a first embodiment, a method includes identifying costs associated with different outcomes of a failure prediction algorithm. The failure prediction algorithm is configured to predict one or more faults with at least one piece of industrial equipment, and the different outcomes include both successful and unsuccessful predictions by the failure prediction algorithm. The method also includes identifying a threshold value for the failure prediction algorithm using the costs, where the threshold value is used by the failure prediction algorithm to identify whether maintenance of the at least one piece of industrial equipment is needed. The method further includes providing the threshold value to the failure prediction algorithm. In addition, the method can include receiving equipment data associated with operation of the at least one piece of industrial equipment, calculating an indicator value based on the equipment data using the failure prediction algorithm, comparing the indicator value to the threshold value, and generating a signal indicating whether maintenance is needed based on the comparison. The threshold value is selected such that a net positive economic benefit is obtained from use of the threshold value with the failure prediction algorithm.

In a second embodiment, an apparatus includes at least one processing device configured to identify costs associated with different outcomes of a failure prediction algorithm. The failure prediction algorithm is configured to predict one or more faults with at least one piece of industrial equipment, and the different outcomes include both successful and unsuccessful predictions by the failure prediction algorithm. The at least one processing device is also configured to identify a threshold value for the failure prediction algorithm using the costs, where the threshold value is used by the failure prediction algorithm to identify whether maintenance of the at least one piece of industrial equipment is needed. The at least one processing device is further configured to provide the threshold value to the failure prediction algorithm. The at least one processing device is configured to select the threshold value such that a net positive economic benefit is obtained from use of the threshold value with the failure prediction algorithm.

In a third embodiment, a non-transitory computer readable medium contains instructions that, when executed by at least one processing device, cause the at least one processing device to identify costs associated with different outcomes of a failure prediction algorithm. The failure prediction algorithm is configured to predict one or more faults with at least one piece of industrial equipment, and the different outcomes include both successful and unsuccessful predictions by the failure prediction algorithm. The medium also contains instructions that, when executed by the at least one processing device, cause the at least one processing device to identify a threshold value for the failure prediction algorithm using the costs, where the threshold value is used by the failure prediction algorithm to identify whether maintenance of the at least one piece of industrial equipment is needed. In addition, the medium contains instructions that, when executed by the at least one processing device, cause the at least one processing device to provide the threshold value to the failure prediction algorithm. The threshold value is selected such that a net positive economic benefit is obtained from use of the threshold value with the failure prediction algorithm.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
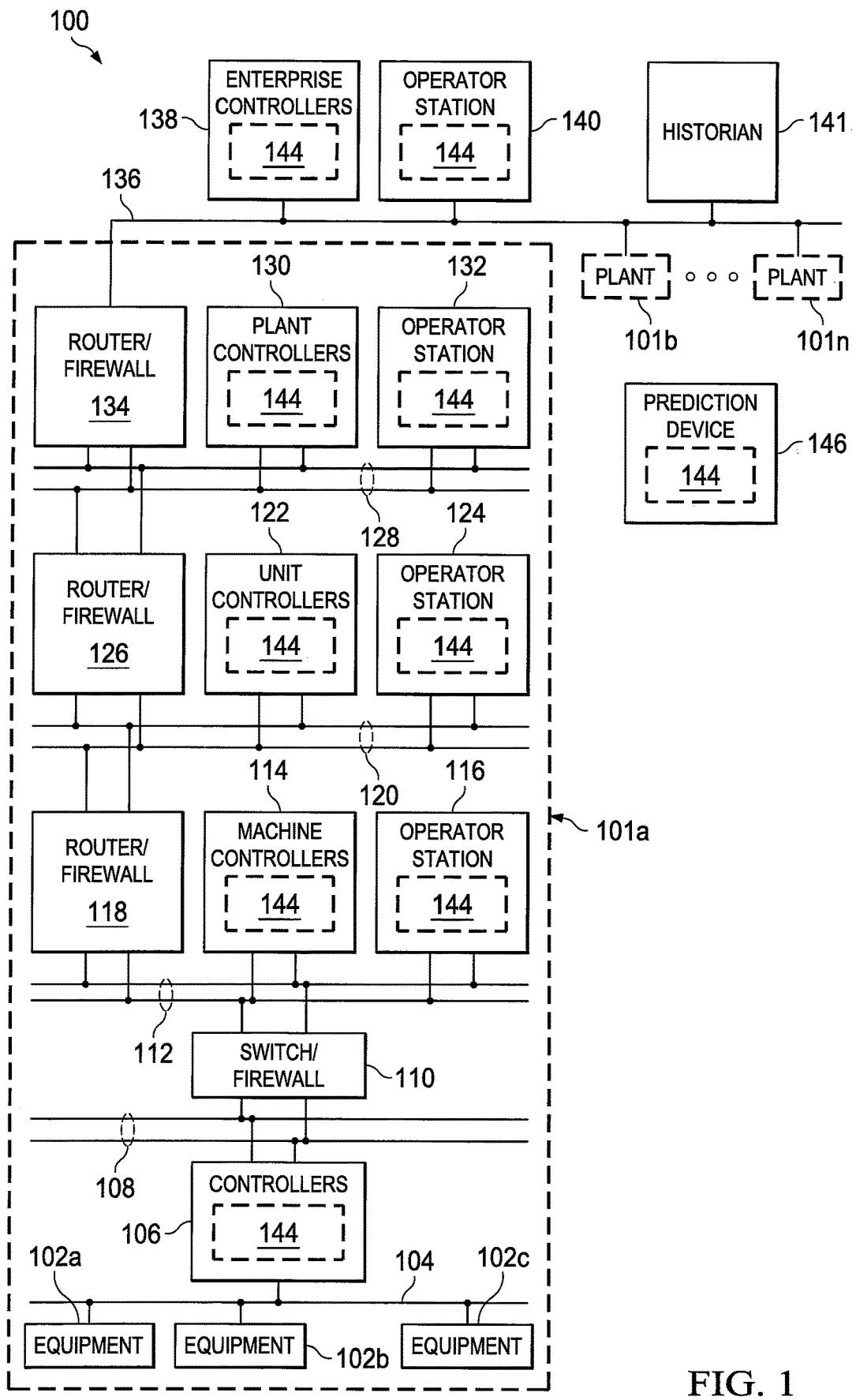
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include various sensors 102a, actuators 102b, and pieces of industrial equipment 102c. The sensors 102a could measure a wide variety of characteristics in the process system, such as temperature, pressure, or flow rate. Often times, the sensors 102a are used to measure one or more characteristics associated with the industrial equipment 102c. The actuators 102b could alter a wide variety of characteristics in the process system, such as by altering operation of the industrial equipment 102c. Each of the sensors 102a includes any suitable structure for measuring one or more characteristics in a process system. Each of the actuators 102b includes any suitable structure for operating on or affecting one or more conditions in a process system. The industrial equipment 102c includes one or more pieces of equipment that perform the function(s) required for at least one industrial process. For instance, the equipment 102c could include any suitable manufacturing or processing equipment to support one or more industrial processes. As specific examples, the equipment 102c could include components supporting oil and gas refining, pulp paper processing, pharmaceutical manufacturing, or chemical processing.

At least one network 104 is coupled to the components 102a-102c. The network 104 can facilitate interaction with the components 102a-102c. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b in order to modify the operation of the industrial equipment 102c. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for controlling one or more pieces of equipment. Each controller 106 could, for example, represent a multivariable controller, such as a Robust Multivariable Predictive Control Technology (RM-PCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106 and related components 102a-102c. For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces or collections of equipment in a process system.

One or more operator stations 116 are coupled to the networks 112. The operator stations 116 represent computing or communication devices providing user access to the machine-level controllers 114, which could then provide user access to the controllers 106 (and possibly the components 102a-102c). As particular examples, the operator stations 116 could allow users to review the operational history of the equipment 102c using information collected by the controllers 106 and/or the machine-level controllers 114. The operator stations 116 could also allow the users to adjust the operation of the components 102a-102c, controllers 106, or machine-level controllers 114. In addition, the operator stations 116 could receive and display warnings, alerts, or other messages or displays generated by the controllers 106 or the machine-level controllers 114. For example, the operator stations 116 could allow users to review failure potentials of the equipment 102c and determine when maintenance on the equipment 102c is needed. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system.

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS® operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). The instructions and data may comprise a software package for use in operating and controlling MPCs, such as PROFIT SUITE by HONEYWELL INTERNATIONAL INC. Each of the controllers and operator stations could also include at least one network interface, such as one or more Ethernet interfaces or wireless transceivers.

As noted above, predictive algorithms typically use a threshold value to determine whether maintenance for a piece of equipment is needed. If the threshold value is too low, the algorithm results in too many service calls for equipment that is functional, meaning the algorithm identifies that maintenance is needed when it is actually not needed. If the threshold value is too high, the algorithm may not schedule adequate maintenance for faulty equipment, meaning the algorithm identifies that maintenance is not needed when it actually is needed.

In accordance with this disclosure, the system 100 supports a prediction tool 144 at one or more locations within the system 100. The prediction tool 144 is configured to determine a cost-effective threshold value for identifying when maintenance (such as repair or replacement) is needed for one or more components within the system 100 (such as one or more pieces of equipment 102c). For example, the prediction tool 144 can determine a cost associated with each possible outcome of an equipment failure prediction. Example outcomes include a true positive, a true negative, a false positive, and a false negative. A true positive means the equipment failure prediction accurately predicts that maintenance is needed, while a true negative means the equipment failure prediction accurately predicts that maintenance is not needed. A false positive means the equipment failure prediction predicted that maintenance is needed when it was not needed, while a false negative means the equipment failure prediction predicted that maintenance is not needed when it was needed. The prediction tool 144 determines a threshold value for identifying when maintenance is needed based on these costs in order to maximize the cost savings of the algorithm's operation.

One conventional approach to setting a prediction threshold value involves setting an acceptable error rate, meaning the detection of true equipment failures versus false alarms, and implementing a prediction algorithm with a threshold that meets the error rate. A Receiver Operating Characteristic (ROC) curve is often used to display the performance of the algorithm at different thresholds and the error rates to which the performance corresponds.

In contrast, the prediction tool 144 operates to include additional information into the threshold value selection, such as the cost associated with each possible outcome of an equipment failure prediction (true positive, true negative, false positive, and false negative). This enables the prediction tool 144 to increase or maximize cost savings of the prediction algorithm's deployment and to select threshold values based on economic considerations rather than just on error rates. In some embodiments, the prediction tool 144 can incorporate a cost calculation into an ROC graph in the form of a "break-even" line. The prediction tool 144 uses the break-even line to evaluate whether an equipment failure prediction algorithm has a better cost benefit than simply repairing equipment after the equipment fails. This allows the prediction tool 144 or personnel to determine (such as by visual inspection or with an automated algorithm) at what threshold cost benefits can be maximized. Additional details regarding this functionality are provided below.

Note that the prediction tool 144 could be implemented in a number of ways and at a number of locations within a system. For example, the prediction tool 144 could be implemented on any of the various controllers or operator stations shown in FIG. 1. The prediction tool 144 could also be implemented on one or more stand-alone devices, such as a prediction device 146. The prediction device 146 could include any suitable structure facilitating the cost-based identification of threshold values, such as a computing device executing a suitable operating system.

Although FIG. 1 illustrates one example of an industrial process control and automation system 100, various changes may be made to FIG. 1. For example, a system could include any number of plants, sensors, actuators, equipment, controllers, servers, operator stations, networks, historians, and prediction tools and devices. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, while FIG. 1 illustrates one example environment in which cost-based identification of equipment failure prediction threshold values can be used, this functionality can be used in any other suitable device or system.

Figure 2:
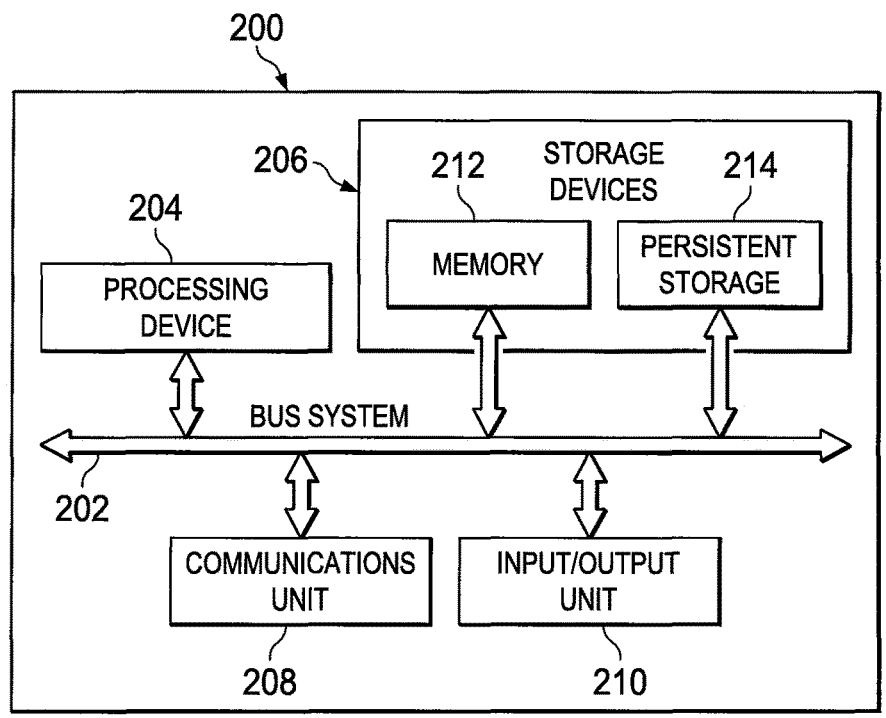
FIG. 2 illustrates an example device for cost-driven predictive equipment failure detection according to this disclosure.

FIG. 2 illustrates an example device 200 for cost-driven predictive equipment failure detection according to this disclosure. The device 200 could, for example, represent the prediction device 146 or other device providing the prediction tool 144 in FIG. 1. However, the device 200 could be used in any other suitable system, and the prediction tool 144 could be used with any other suitable device.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. For example, the processing device 204 can execute instructions to determine a cost-effective threshold value for use in determining when equipment may require maintenance. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card that facilitates communications over at least one Ethernet or serial connection. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

Although FIG. 2 illustrates one example of a device 200 for cost-driven predictive equipment failure detection, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
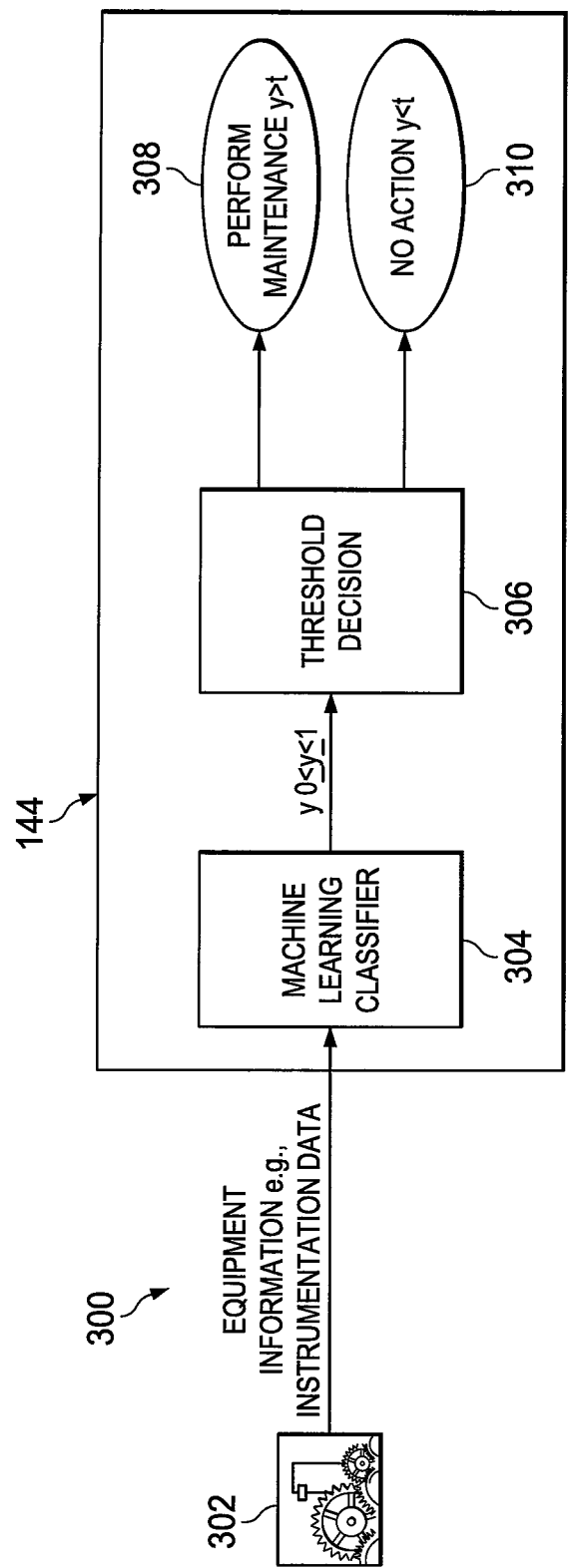
FIG. 3 illustrates an example cost-driven predictive equipment failure detection technique according to this disclosure.

FIG. 3 illustrates an example cost-driven predictive equipment failure detection technique 300 according to this disclosure. The detection technique 300 could, for example, be implemented using the prediction tool 144 in the system 100 of FIG. 1. However, the detection technique 300 could be used with any suitable device and in any suitable system.

As shown in FIG. 3, equipment information (such as sensor or other instrumentation data) associated with equipment 302 is provided to the prediction tool 144. The equipment 302 could, for example, denote the equipment 102c in the system 100 of FIG. 1. The prediction tool 144 can receive the information in any suitable manner, such as directly from sensors, controllers, or other components or indirectly through historians or other components.

When the prediction tool 144 receives the equipment information, a machine learning classifier 304 analyzes the received information to identify an indicator value y, which ranges from zero to one in this example. The indicator value varies and is indicative of the possibility of a fault or other problem with the equipment. A number of classification algorithms are known in the art for analyzing equipment information and calculating an indicator value. The machine learning classifier 304 includes any suitable logic for calculating indicator values for equipment. The machine learning classifier 304 could, for example, implement classification algorithms such as logistic regression, random forest, or support vector machine algorithms. The machine learning classifier 304 could also implement regression algorithms such as Bayesian Ridge Regression or Kernel Ridge Regression algorithms.

A threshold decision unit 306 calculates a suitable threshold value t for comparison with the indicator value y. If the indicator value y exceeds the threshold value t, a decision 308 can be made that maintenance is needed with the equipment. If the indicator value y does not exceed the threshold value t, a decision 310 can be made that maintenance is not needed with the equipment. The threshold decision unit 306 includes any suitable logic for identifying a threshold value.

The threshold decision unit 306 uses costs associated with both successful and unsuccessful predictions, such as a true positive (TP), a false positive (FP), a true negative (TN), and a false negative (FN), to calculate a suitable threshold value. The costs can be compared to a baseline cost associated with only performing maintenance and repairs when a defect occurs. As such, a much more informed and economically motivated selection of the threshold value can be made, which increases or maximizes the savings obtainable through predictive equipment failure detection systems.

The threshold decision unit 306 can identify a threshold value based on an economic cost of operating at least one piece of equipment (while described below as a unit, the economic cost can be related to a single piece of equipment or any collection of multiple pieces of equipment). The economic cost of operating equipment can include a summation of the costs of the four potential outcomes (TP, FP, TN, and FN). In particular embodiments, the economic cost can be calculated using the following equation:

$$CostPerUnit = \frac{CostPerTP*TP + CostPerFP*FP + CostPerTN*TN + CostPerFN*FN}{TP + FP + TN + FN}$$

where CostPerTP, CostPerFP, CostPerTN, and CostPerFN denote the costs of the four potential outcomes and TP, FP, TN, and FN denote the number of occurrences of the four potential outcomes.

The CostPerUnit value can also be refactored in terms of a true positive rate (TP/(TP+FN))=1−β, a false positive rate (FP/(FP+TN))=α, and Q. Q is the ratio of the number of faults to the number of non-faults and can be expressed as (TP+FN)/(TN+FP). Refactoring the CostPerUnit value could then be done as follows:

$$CostPerUnit = \frac{Q}{Q+1}(CostPerTP - CostPerFN)(1 - \beta) +$$

$$\frac{1}{Q+1}(CostPerFP - CostPerTN)\alpha +$$

$$\frac{1}{Q+1}(CostPerTN + Q \times CostPerFN)$$

As illustrated in figures described below, an ROC curve for the machine learning classifier 304 can plot α versus (1−β) and thereby provide a cost for each threshold of a prediction. A cost baseline can be determined without predictive models so that failures are not predicted and equipment is only repaired or replaced after the equipment has already experienced a fault. In some embodiments, the cost baseline can be expressed as (CostPerFN×(TP+FN))+(CostPerTN×(TN+FP)). The baseline cost can also be divided by a number of units and can be refactored for Q. Thus, a base cost per unit can be expressed as (CostPerFN×Q)+(CostPerTN/(Q+1)). The baseline cost can be set equal to a prediction CostPerUnit to obtain a break-even line. The break-even line for bounce back scenarios can be expressed as follows:

$$(1 - \beta) = \frac{1}{Q}\frac{(CostPerFP - CostPerTN)}{(CostPerFN - CostPerTP)}\alpha$$

The break-even line can be plotted on an ROC graph. Points on the ROC curve that lie above or to the left of the break-even line are points where cost savings can be realized by implementing a predictive maintenance system. The point that is furthest above the break-even line could denote the point that maximizes cost savings, and that point can be used to determine the threshold value t.

Although FIG. 3 illustrates one example of a cost-driven predictive equipment failure detection technique 300, various changes may be made to FIG. 3. For example, the detection technique 300 could involve any other suitable mechanism for identifying the indicator value y.

Figure 4:
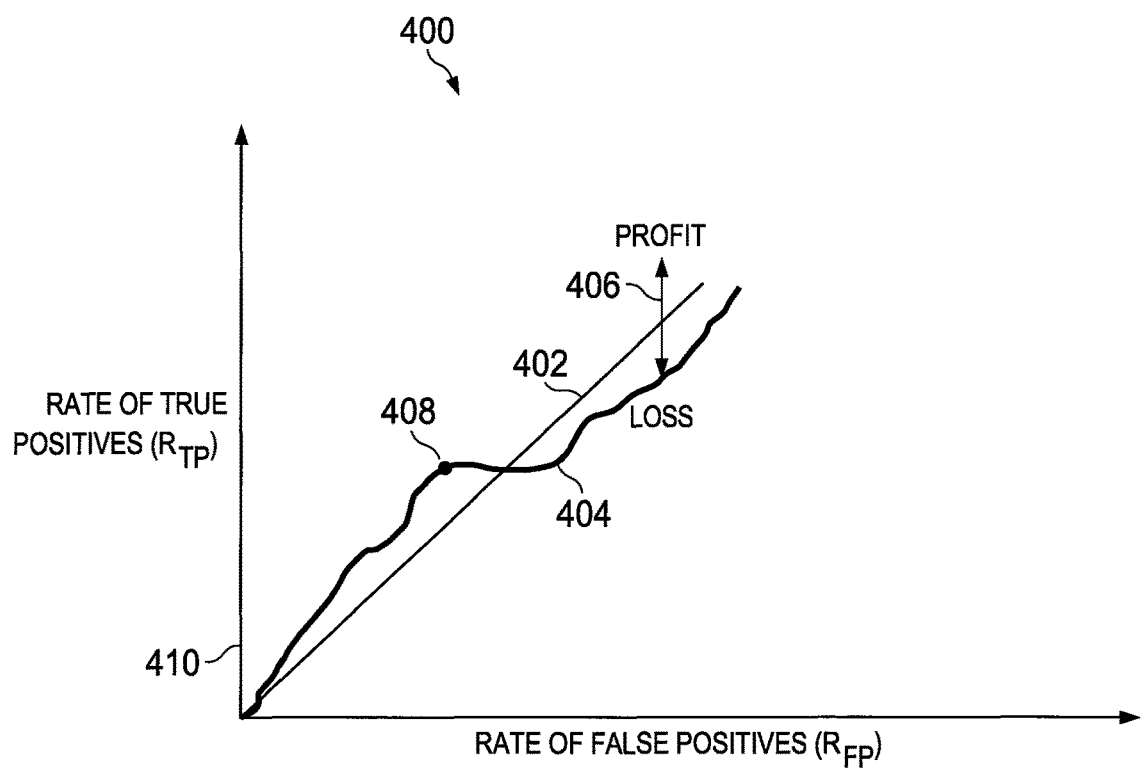
FIGS. 4 and 5 illustrate example receiver operating characteristic (ROC) curves according to this disclosure.
Figures 5, 7:
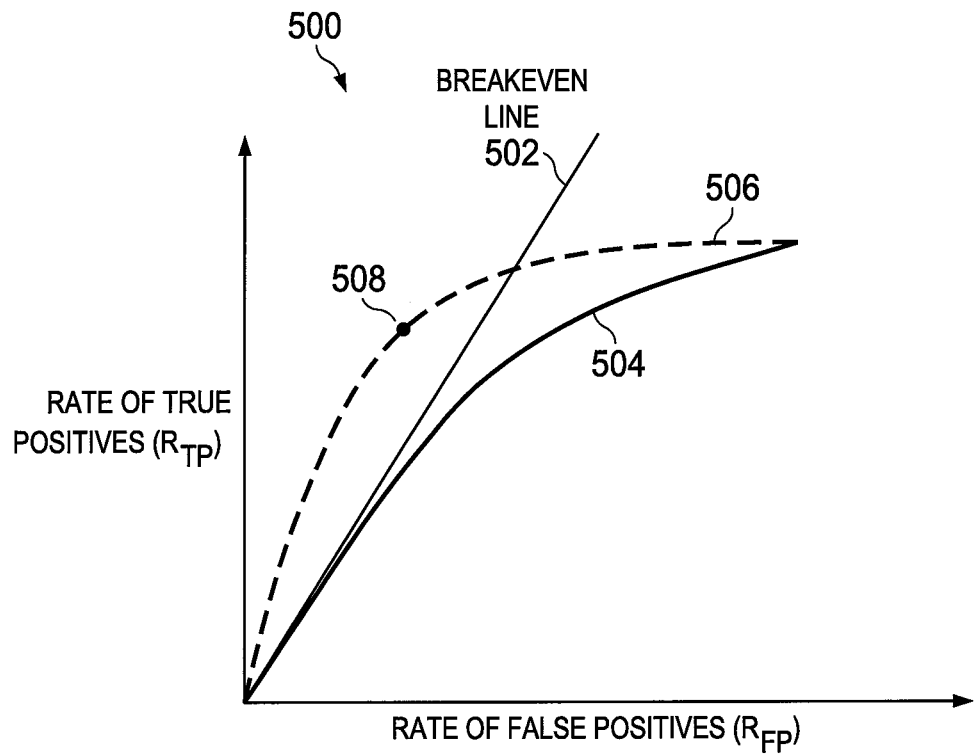
FIGS. 6, 7, 8A, and 8B illustrate an example application of a failure prediction algorithm according to this disclosure.

FIGS. 4 and 5 illustrate example receiver operating characteristic (ROC) curves according to this disclosure. As shown in FIG. 4, an ROC curve 400 illustrates a break-even cost line 402 and plotted points 404 that reflect true positive rates relative to false positive rates of a particular piece of equipment. A vertical distance 406 between the break-even cost line 402 and the plotted points 404 indicates the profit or loss for a particular piece of equipment. In this example, a point 408 has the largest positive difference above the break-even cost line 402, indicating the maximum cost benefit for a particular piece of equipment.

The prediction tool 144 can identify the break-even cost line 402 in any suitable manner. As described above, in some embodiments, the cost baseline can be expressed as (CostPerFN×(TP+FN))+(CostPerTN×(TN+FP)) or as (CostPerFN×Q)+(CostPerTN/(Q+1)). The prediction tool 144 can identify the point 408 highest above the break-even cost line 402 once the break-even cost line 402 is calculated, and the threshold value t could be calculated using that point 408. For example, since the point 408 lies above the break-even cost line 402, the point 408 can be used to identify a TP rate and an FP rate that can be mapped back to the threshold value t corresponding to the TP and FP rates.

As shown in FIG. 5, an ROC curve 500 illustrates a break-even cost line 502, a curve 504 indicating a weak classifier design, and a curve 506 indicating a strong classifier design. The curve 504 remains at or below (to the right of) the break-even cost line 502, indicating that the weak classifier design provides little or no benefit. In contrast, a significant portion of the curve 506 remains above (to the left of) the break-even cost line 502, indicating that the strong classifier design can provide significant cost benefits. Again, a point 508 having the greatest vertical distance above the break-even cost line 502 indicates the economic optimal decision threshold value, and the point 508 can be used to determine the threshold value t.

Among other things, this approach allows users to evaluate if a classifier is economically viable or not by determining whether points are above or below the break-even line. When a classifier is viable, this approach also gives users the ability to choose a threshold value for increased or maximum economic benefit.

Although FIGS. 4 and 5 illustrates example ROC curves, various changes may be made to FIGS. 4 and 5. For example, any other suitable curves, points, and lines could be used depending on the equipment being monitored.

Figure 6:
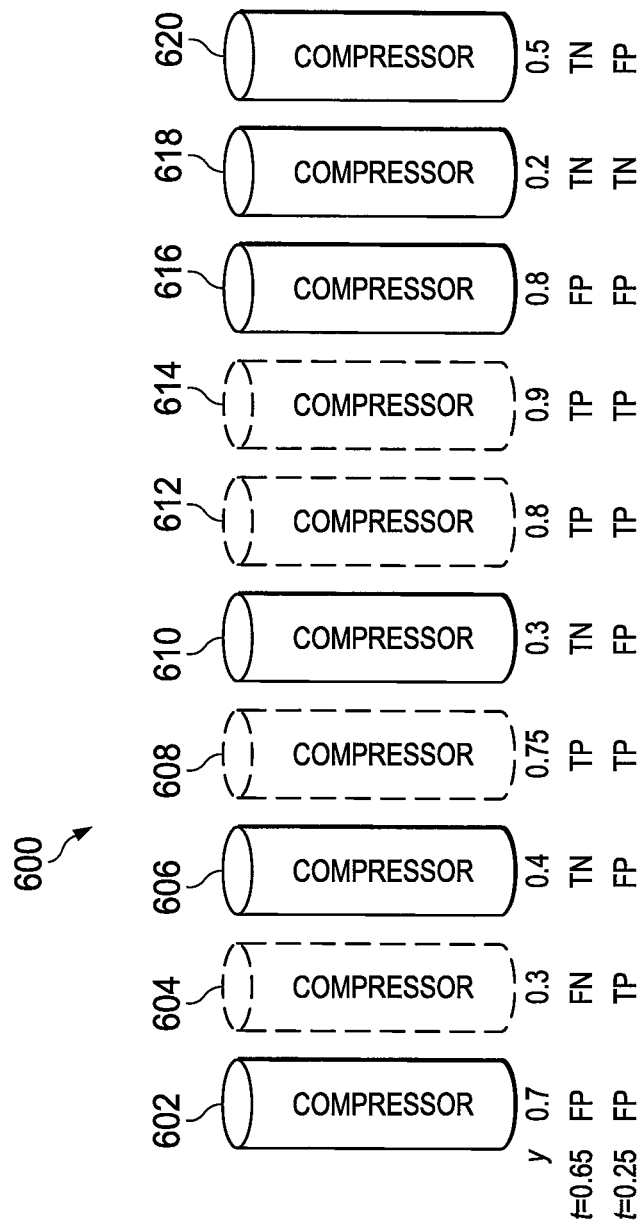

FIGS. 6, 7, 8A, and 8B illustrate an example application of a failure prediction algorithm according to this disclosure. FIG. 6 shows an example system 600 containing multiple pieces of industrial equipment 602-620, which in this example denote compressors. Some of the compressors shown in dashed lines (equipment 604, 608, 612, and 614) denote equipment that will fail, while the remaining compressors will not. FIG. 6 also includes indicator values y computed for the pieces of industrial equipment 602-620 using a classifier.

Selecting different threshold values t will affect the classifier's TP and FP rates. The behavior of a classifier with a specific threshold value t can be expressed using an outcome matrix. FIG. 7 illustrates a generic outcome matrix 700, which indicates the four possibilities of determining if and when a failure is detected. For example, a prediction that a failure has occurred when the failure has actually occurred is a true positive. A prediction that a failure has occurred when the failure has not actually occurred is a false positive. A prediction that a failure has not occurred when the failure has actually occurred is a false negative. A prediction that a failure has not occurred when the failure has not actually occurred is a true negative. Specific values in an outcome matrix can be used as the TP, TN, FP, and FN values described above.

Figures 8A, 8B, 9:
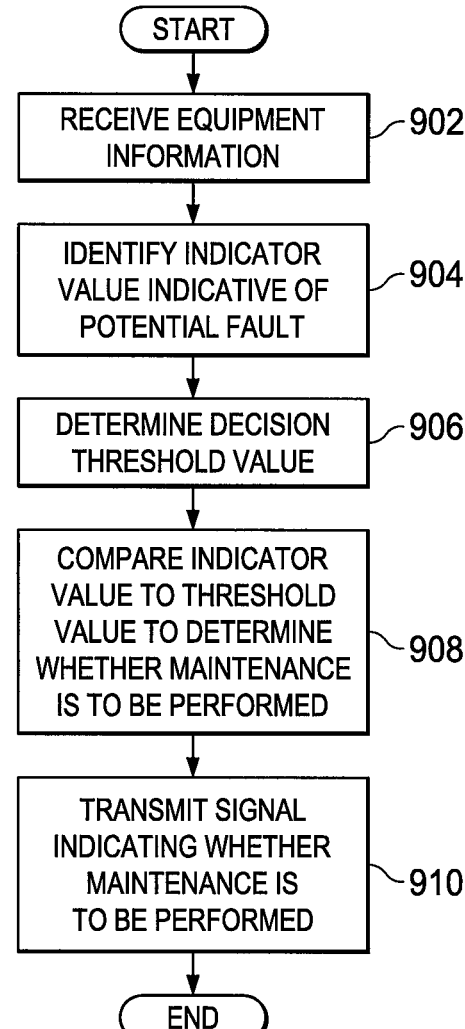
FIG. 9 illustrates an example method for cost-driven predictive equipment failure detection according to this disclosure.

FIGS. 8A and 8B illustrate specific outcome matrices 800A and 800B for classifiers that analyze data from the pieces of equipment 602-620 in FIG. 6 using different threshold values t. In FIG. 8A, the outcome matrix 800A is generated using a threshold value of 0.25. In this case, a true positive value is 4.0, a false positive value is 5.0, a false negative value is 0.0, and a true negative value is 1.0. Accordingly, a true positive rate is 4/4 (defined as TP/(TP+FN)) and a false positive rate is 5/6 (defined as FP/(FP+TN)). In FIG. 8B, the outcome matrix 800B is generated using a threshold value of 0.65. In this case, a true positive value is 3.0, a false positive value is 2.0, a false negative value is 1.0, and a true negative value is 4.0. Accordingly, a true positive rate is 3/4 (defined as TP/(TP+FN)) and a false positive rate is 2/6 (defined as FP/(FP+TN)).

As can be seen here, the threshold value of 0.25 provides a better true-positive rate and a worse false positive rate, while the threshold value of 0.65 provides a worse true-positive rate and a better false positive rate. By taking into account the costs of the different possible outcomes of the failure prediction algorithm, an ideal threshold value can be selected that can increase or maximize the economic benefit of the failure prediction algorithm.

Although FIGS. 6, 7, 8A, and 8B illustrate one example of an application of a failure prediction algorithm, various changes may be made to FIGS. 6, 7, 8A, and 8B. For example, any other suitable industrial equipment, thresholds, and outcome matrices could be used depending on the application.

FIG. 9 illustrates an example method 900 for cost-driven predictive equipment failure detection according to this disclosure. For ease of explanation, the method 900 is described as being performed by the prediction tool 144 in the system 100 of FIG. 1. However, the method 900 could be used with any suitable device or system.

Equipment information indicating one or more characteristics of a piece of equipment is received at step 902. This could include, for example, the prediction tool 144 receiving the equipment information from any suitable source(s), such as one or more sensors, actuators, controllers, or process historians. An indicator value indicative of a potential fault for the piece of equipment is identified at step 904. This could include, for example, the prediction tool 144 calculating an indicator having a value between zero and one indicating a likelihood of a fault.

A decision threshold value is determined at step 906. This could include, for example, the prediction tool 144 incorporating a cost calculation into an ROC graph in the form of a break-even line. Points that reflect true positive rates relative to false positive rates of a particular piece of equipment can be plotted on the ROC graph, and the point having the maximum vertical distance above the break-even line can be identified. This point can be used to identify the threshold value.

The indicator value is compared to the threshold value at step 908, and a signal is transmitted indicating whether maintenance is to be performed at step 910. This could include, for example, the prediction tool 144 transmitting a signal to an operator station, maintenance scheduler, or other device or system when the indicator value exceeds the threshold value.

Although FIG. 9 illustrates one example of a method 900 for cost-driven predictive equipment failure detection, various changes may be made to FIG. 9. For example, while shown as a series of steps, various steps shown in FIG. 9 could overlap, occur in parallel, occur in a different order, or occur multiple times. As a particular example, the threshold value for a particular piece of equipment could be calculated at any suitable time and need not be calculated after equipment information is received and an indicator value is calculated. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for the predictive detection of equipment failure comprising:
   receiving from a prediction tool, equipment information indicating one or more characteristics of a piece of equipment including information from one or more sensors, actuators, controllers, or process historians,
   identifying by the prediction tool an indicator value, based on the equipment information using a classifier of a failure prediction algorithm by identifying costs associated with different outcomes of the failure prediction algorithm, the failure prediction algorithm configured to predict one or more faults with at least one piece of industrial equipment, the different outcomes including both successful and unsuccessful predictions by the failure prediction algorithm, wherein the different outcomes of the failure prediction algorithm comprise a true positive, a true negative, a false positive, and a false negative;
   incorporating a cost calculation into a receiver operating characteristic (ROC) curve in the form of a cost breakeven baseline that evaluates the cost benefit of repairing or replacing the equipment;
   determining a threshold value, for the failure prediction algorithm using a point on the classifier's receiver operating characteristic (ROC) curve on the cost breakeven baseline showing the true positive rates relative to the false positive rates, the threshold value used by the failure prediction algorithm to identify whether maintenance of the at least one piece of industrial equipment is needed; and
   providing the threshold value to the failure prediction algorithm wherein the threshold value is selected such that a net positive economic benefit is obtained from use of the threshold value with the failure prediction algorithm;
   generating a signal for maintenance of the at least one piece of industrial equipment by comparing the indicator value with the threshold value.

2. The method of claim 1, wherein the different outcomes of the failure prediction algorithm comprise:
   the true positive in which the failure prediction algorithm correctly predicts that maintenance of the at least one piece of industrial equipment is needed;
   the true negative in which the failure prediction algorithm correctly predicts that maintenance of the at least one piece of industrial equipment is not needed;
   the false positive in which the failure prediction algorithm incorrectly predicts that maintenance of the at least one piece of industrial equipment is needed; and
   the false negative in which the failure prediction algorithm incorrectly predicts that maintenance of the at least one piece of industrial equipment is not needed.

3. The method of claim 2, wherein identifying the threshold value comprises:
   identifying a cost breakeven baseline associated with the failure prediction algorithm; and
   identifying true positive rates relative to false positive rates for a classifier of the failure prediction algorithm.

4. The method of claim 3, wherein identifying the threshold value further comprises:
   the identified point having a largest positive difference from the cost breakeven baseline; and
   identifying the threshold value using the identified point.

5. The method of claim 3, wherein the cost breakeven baseline is determined as a cost of repairing or replacing the at least one piece of equipment after the at least one piece of equipment has already experienced the one or more faults without prediction of the one or more faults.

6. An apparatus for the predictive detection of equipment failure comprising:
at least one processing device configured to:
receive from a prediction tool, equipment information indicating one or more characteristics of a piece of equipment including information from one or more sensors, actuators, controllers, or process historians,
identify by the prediction tool an indicator value, based on the equipment information using a classifier of a failure prediction algorithm by identifying costs associated with different outcomes of the failure prediction algorithm, the failure prediction algorithm configured to predict one or more faults with at least one piece of industrial equipment, the different outcomes including both successful and unsuccessful predictions by the failure prediction algorithm, wherein the different outcomes of the failure prediction algorithm comprise a true positive, a true negative, a false positive, and a false negative;
incorporate a cost calculation into a receiver operating characteristic (ROC) curve in the form of a cost breakeven baseline that evaluates the cost benefit of repairing or replacing the equipment;
determine a threshold value for the failure prediction algorithm using a point on the classifier's receiver operating characteristic (ROC) curve on the cost breakeven baseline showing the true positive rates relative to the false positive rates, the threshold value used by the failure prediction algorithm to identify whether maintenance of the at least one piece of industrial equipment is needed;
provide the threshold value to the failure prediction algorithm; wherein the at least one processing device is configured to select the threshold value such that a net positive economic benefit is obtained from use of the threshold value with the failure prediction algorithm, and
generate a signal for maintenance of the at least one piece of industrial equipment by comparing the indicator value with the threshold value.

7. The apparatus of claim 6, wherein the different outcomes of the failure prediction algorithm comprise:
the true positive in which the failure prediction algorithm correctly predicts that maintenance of the at least one piece of industrial equipment is needed;
the true negative in which the failure prediction algorithm correctly predicts that maintenance of the at least one piece of industrial equipment is not needed;
the false positive in which the failure prediction algorithm incorrectly predicts that maintenance of the at least one piece of industrial equipment is needed; and
the false negative in which the failure prediction algorithm incorrectly predicts that maintenance of the at least one piece of industrial equipment is not needed.

8. The apparatus of claim 7, wherein the at least one processing device is configured to:
identify a cost breakeven baseline associated with the failure prediction algorithm; and
identify true positive rates relative to false positive rates for a classifier of the failure prediction algorithm.

9. The apparatus of claim 8, wherein the at least one processing device is configured to:
the identified point having a largest positive difference from the cost breakeven baseline; and
identify the threshold value using the identified point.

10. The apparatus of claim 8, wherein the at least one processing device is configured to determine the cost breakeven baseline as a cost of repairing or replacing the at least one piece of industrial equipment after the at least one piece of equipment has already experienced the one or more faults without prediction of the one or more faults.

11. A non-transitory computer readable medium for the predictive detection of equipment failure containing instructions that, when executed by at least one processing device, cause the at least one processing device to:
receive from a prediction tool, equipment information indicating one or more characteristics of a piece of equipment including information from one or more sensors, actuators, controllers, or process historians,
identify by the prediction tool an indicator value, based on the equipment information using a classifier of a failure prediction algorithm by identifying costs associated with different outcomes of the failure prediction algorithm, the failure prediction algorithm configured to predict one or more faults with at least one piece of industrial equipment, the different outcomes including both successful and unsuccessful predictions by the failure prediction algorithm, wherein the different outcomes of the failure prediction algorithm comprise a true positive, a true negative, a false positive, and a false negative;
incorporate a cost calculation into a receiver operating characteristic (ROC) curve in the form of a cost breakeven baseline that evaluates the cost benefit of repairing or replacing the equipment;
determine a threshold value for the failure prediction algorithm using a point on the classifier's receiver operating characteristic (ROC) curve on the cost breakeven baseline showing the true positive rates relative to the false positive rates, the threshold value used by the failure prediction algorithm to identify whether maintenance of the at least one piece of industrial equipment is needed;
provide the threshold value to the failure prediction algorithm; wherein the threshold value is selected such that a net positive economic benefit is obtained from use of the threshold value with the failure prediction algorithm, and
generate a signal for maintenance of the at least one piece of industrial equipment by comparing the indicator value with the threshold value.

12. The non-transitory computer readable medium of claim 11, wherein the different outcomes of the failure prediction algorithm comprise:
the true positive in which the failure prediction algorithm correctly predicts that maintenance of the at least one piece of industrial equipment is needed;
the true negative in which the failure prediction algorithm correctly predicts that maintenance of the at least one piece of industrial equipment is not needed;
the false positive in which the failure prediction algorithm incorrectly predicts that maintenance of the at least one piece of industrial equipment is needed; and
the false negative in which the failure prediction algorithm incorrectly predicts that maintenance of the at least one piece of industrial equipment is not needed.

13. The non-transitory computer readable medium of claim 12, wherein the instructions that when executed cause the at least one processing device to identify the threshold value comprise:
  instructions that when executed cause the at least one processing device to:
    identify a cost breakeven baseline associated with the failure prediction algorithm; and
    identify true positive rates relative to false positive rates for a classifier of the failure prediction algorithm.

14. The non-transitory computer readable medium of claim 13, wherein the instructions that when executed cause the at least one processing device to identify the threshold value further comprise:
  instructions that when executed cause the at least one processing device to:
    the identified point having a largest positive difference from the cost breakeven baseline; and
    identify the threshold value using the identified point.

15. The non-transitory computer readable medium of claim 13, wherein the cost breakeven baseline is based on a cost of repairing or replacing the at least one piece of equipment after the at least one piece of industrial equipment has already experienced the one or more faults without prediction of the one or more faults.

* * * * *